June 3, 1958
G. W. HULSHIZER
2,837,317
HOLE CLEANING DEVICE
Filed Feb. 15, 1957
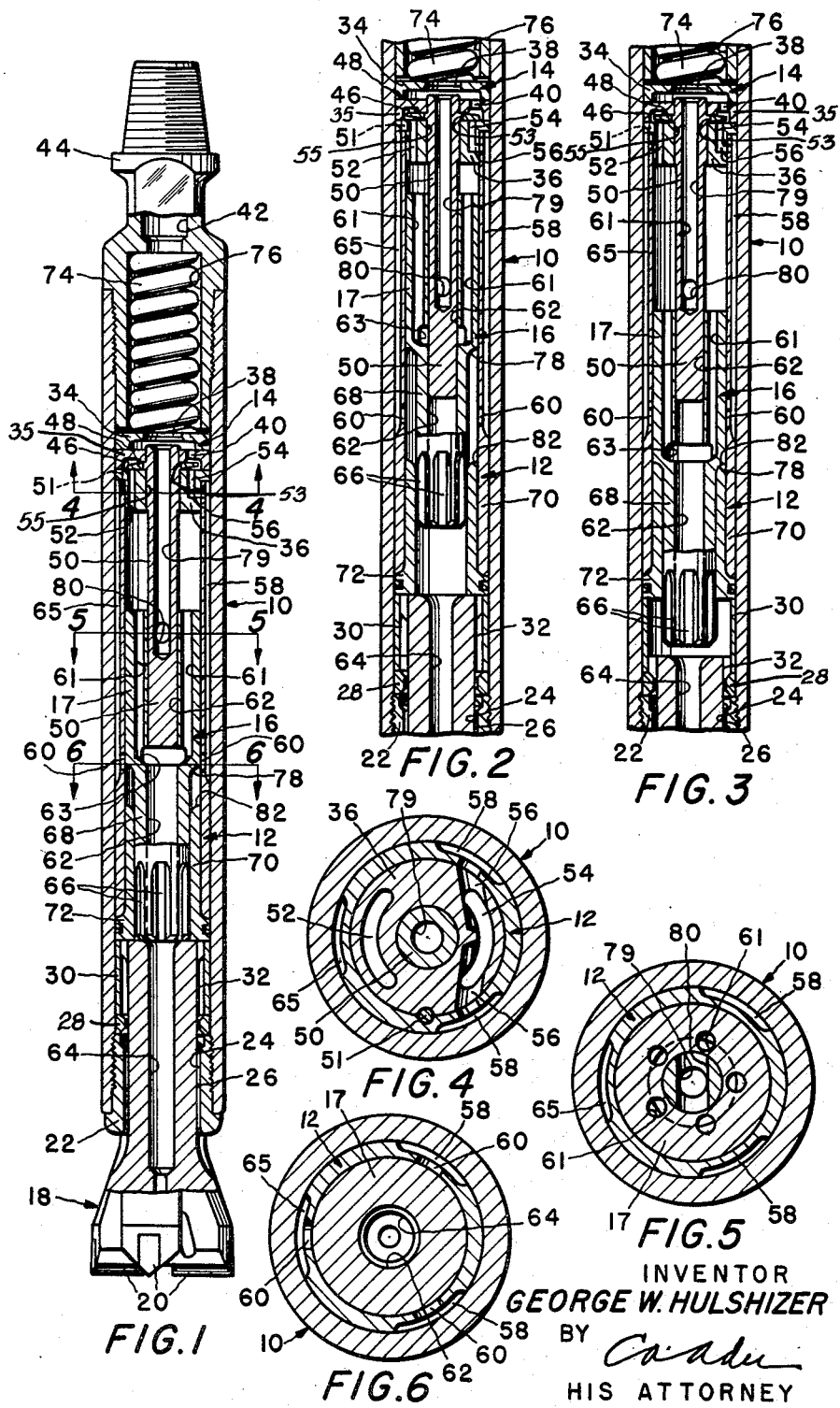
INVENTOR
GEORGE W. HULSHIZER
BY
HIS ATTORNEY United States Patent Office 2,837,317
Patented June 3, 1958

2,837,317
HOLE CLEANING DEVICE

George W. Hulshizer, Stewartsville, N. J., assignor to Ingersoll-Rand Company, New York, N. Y., a corporation of New Jersey Application February 15, 1957, Serial No. 640,382

3 Claims. (Cl. 255—49)

This invention relates to improvements in rock drills, and more particularly to a blowing device for pneumatically operated percussive drills of the type adapted to be inserted into the hole being drilled thereby and commonly known as "down-the-hole" drills.

An object of the present invention is to provide a rock drill that will permit the introduction of an uninterrupted flow of pressure fluid, under full line pressure, into the drill hole to remove the cuttings therefrom without the necessity of having the piston of the drill reciprocate.

Other objects will become obvious from the following specification and drawings in which, Figure 1 is a longitudinal elevation, partly in section, of the preferred form of the drill, Figs. 2 and 3 are longitudinal elevations, partly in section, of the preferred form of the drill showing the piston in various operating positions, and Figs. 4, 5 and 6 are cross sectional views of Fig. 1 taken along the lines 4—4, 5—5 and 6—6, respectively, looking in the direction of the arrows.

Referring to the drawings, the drill as shown in Fig. 1 comprises, in general, a tubular casing 10 housing a sleeve 12 and valve 14 slidably mounted therein and constantly urged against longitudinal movement relative to the casing 10 by retainers at the opposite ends of the casing 10. The sleeve 12 is formed of a considerably harder material than the casing 10 to withstand the wear of a piston 16 reciprocated in the sleeve by pressure fluid valved alternately to the opposite ends of the piston by the valve 14. A working implement 18 is mounted at the forward end of the drill casing 10 with an end positioned to be struck by the piston 16.

Referring now in greater detail to the construction of the drill, the working implement 18 includes a head having cutters 20 arranged to cut a hole of slightly greater diameter than the daimeter of the casing 10 such that the drill casing may be lowered into the hole being drilled. The working implement is retained in the casing 10 and engaged for rotation therewith by means of a chuck. The chuck includes an end member 22 threaded in the end of the casing 10 and having internal splines 24 interlockingly engaged in grooves 26 in the shank of the working implement 18. The chuck also includes a ring 28 clamped between the end member 22 and a sleeve 30, and extending into the groove 32 in the shank of the working implement for limiting the longitudinal movement of the working implement 18 relative to the casing 10.

The chuck part, or sleeve, 30 is split longitudinally on one side (not shown) and has a tight spring fit in the casing 10. The purpose of this is that the sleeve 30 will hold the parts, such as the valve 14 and sleeve 12, in the casing when the chuck parts 22 and 28 are disconnected to remove the working implement 18 for repair or replacement.

The valve 14, shown by way of illustration only, includes three members 34, 35 and 36. The members 34 and 35 of the cage are provided with ports 38 and 40, respectively, for the passage of pressure fluid from the fluid supply passage 42 in the backhead 44 to the valve chamber 46. The flow of pressure fluid from the valve chamber 46 for actuating the piston 16 is controlled by means of a conventional flapper type valve 48 mounted for rocking movement about a central stem 50 mounted on the lower member 36 of the valve cage. A valve of this type is shown and described in detail in U. S. Patent No. 1,598,440. The central stem 50 is press fitted in a bore 55 of the cage member 36 and is provided with a collar 53 abutting the upper end of the member 36. The collar 53 is positioned between the two members 35 and 36 to prevent possible longitudinal movement of the central stem 50 relative to the casing 10 and also serves as the center of oscillation of the flapper valve 48.

In furtherance of this end a port 52 is formed in the valve member 36 leading from the chamber 46 to the rearward end portion of the interior of the sleeve 12 and is positioned to be covered by the flapper valve 48 when rocked in the position shown in the drawings. Positioned on the opposite side of the cage member 36 is a port 54 arranged to be covered by the flapper valve 48 when rocked into its opposite position. Port 54 is communicated through a port 56, longitudinal passage 58 and port 60 with the forward end portion of the interior of the sleeve 12.

The valve 14 is engaged against rotational movement relative to the sleeve 12 by means of a pin 51 to insure that the port 54 is at all times in alignment with the ports 56 in the sleeve 12. In the particular embodiment shown, two such longitudinal passages 58 are shown to insure an adequate supply of air for reversing the piston. Also shown is a passage 65 communicated with the forward end only of the sleeve 12. This passage serves as a cushioning chamber for air trapped into the forward end of the sleeve during the working stroke of the piston.

Pressure fluid is exhausted from the opposite ends of the sleeve 12. The exhaust is utilized as a cleansing fluid for blowing drill cuttings free of the hole. In furtherance of this end, a central bore 62 extends through the piston 16 and, in the particular embodiment shown, includes an enlarged portion 63 intermediate the ends thereof. Also formed in the piston 16 are five secondary passages 61 communicating at their forward ends with the central bore 62 at the enlarged portion 63 and terminating at their other ends at the rearward end surface of the piston 16. In the particular embodiment shown there are five secondary passages 61, but the invention includes either a single or a plurality of such secondary passages. Pressure fluid is exhausted from the rearward end of the sleeve 12 through the five secondary passages 61, the enlarged portion 63, and the central bore 62 of the piston 16, and thence through the central bore 64 in the working implement 18, whenever the piston is in the forward limiting position of its working stroke. Exhaust through these passages is cut off when the piston approaches the rearward limiting position of its stroke by the extension of the stem 50 through the enlarged portion 63 beyond the forward ends of the secondary passages 61. The stem 50 has a sliding fit with at least portions of the bore 62 located on opposite sides of the forward ends of the secondary passages 61, and is of a length such that the stem extends beyond the forward ends of the secondary passages 61 when the piston is in its normal rearward limiting position to stop the flow of compressed air from the secondary passages 61 into the central bore 62, and lies rearwardly of the forward ends of the secondary passages 61 when the piston is in its normal forward limiting position to permit the flow of compressed air from the secondary passages 61 into the central bore 62.

At approximately the same time that the exhaust from the back end of the sleeve is cut off, the forward end of the cylinder is exhausted through grooves 66 in the reduced extension 68 of the piston 16 and thence through the bore 64 of the working implement. It is to be noted that with this type of piston construction, a tubular guide piece 70 is mounted at the forward end of the sleeve 12 and includes a flange 72 clamped between the sleeve 30 and the forward end of the sleeve 12. A sealing ring is mounted in the flange to limit the escape of pressure fluid leaking from the passage 58 between the sleeve 12 and casing 10.

All inner parts of the drill are held in position in the casing 10 by the chuck part 22 and the backhead 44, both internally threaded in the casing 10. As shown, the rear retainer includes a relatively heavy spring 74 mounted in a recess 76 in the backhead 44 and biased between the end surface of the recess 76 and the valve cage member 34. In this way the cage is constantly urged into engagement with the rearward end of the sleeve 12, forcing the sleeve into contact at its forward end with the flange 72 which is restrained against forward longitudinal movement by abutting the sleeve 30, ring 28 and rearward end of the chuck and member 22. The spring serves as a shock absorber in transmitting shock from the working implement to the drill rod, not shown, connected to the backhead 44.

In accordance with an object of the invention, means are provided for periodically effecting a thorough cleansing of the drill hole whenever the detritus resulting from drilling accumulates and interferes with the progress of the work. To this end, in the stem 50 is formed a longitudinal bore 79 which communicates at its rearward end with the air supply and at its forward end with a port 80. The port 80 is at a location such that the port 80 is covered by the sliding-contact surface of the central bore 62 of the piston 16 when it ranges between its forward and rearward limiting positions during the normal operation of the drill. The port 80 is uncovered when the piston is moved forwardly of its normal forward limiting position by cutting off the air supply and moving the drill away from the work. The distance of the port 80 from the stop, or rearward end, 82 of the tubular guide piece 70, measured along the axis of the drill must be greater than the distance from the portion 78 of the piston that contacts the stop 82 to the rearward end of the rearmost portion of the central bore 62 having sliding contact with the stem 50 measured along the axis of the piston. The port 80 is uncovered when the piston 16 moves forward beyond the normal forward limiting position, as for example when the surface 78 contacts the stop 82 as shown in Fig. 3.

In operation, assuming the parts to be in the position shown in Fig. 1, air is conducted from the passage 42 to the valve 14 and thence through the port 54, passages 58 and ports 60 to the forward end of the sleeve 12. This fluid acting on the pressure surface 78 of the piston 16 actuates the piston rearwardly. When the piston 16 has moved a sufficiently great distance rearwardly to uncover the rearward ends of the grooves 66, as shown in Fig. 2, pressure fluid is exhausted from the forward end of the sleeve 12 and the exhaust from the rearward end is cut off. The compressive action of the piston increases the pressure in the rearward portion of the sleeve sufficiently to throw the flapper valve 48 into its other limiting position cutting off the supply of pressure fluid to the forward end of the piston and supplying pressure fluid to the rearward end portion thereof. This reversal in supply, actuates the piston forwardly until the enlarged portion 63 of the central bore 62 of the piston 16 moves clear of the stem 50 and the piston cuts off the exhaust through the grooves 66. Accordingly, the pressure behind the piston drops and the pressure in front of the piston increases, causing the valve to be thrown into the position shown in the drawing. In the normal operation of the drill, the sliding-contact surface of the central bore 62 of the piston covers the port 80 at all times.

If at the start of the operation the valve is in the opposite position to that shown in Fig. 1, air is conducted from the passage 42 to the valve 14 and thence through the port 52 to the rearward end of the piston 16 tending to move the piston forward. If the piston happens to be already in its forward limiting position, the current of air past the flapper valve is sufficient to throw the flapper valve into the other position shown in Fig. 1. The drill then operates as described above.

Whenever drilling progress is being impeded by accumulated cuttings in the drill hole and it is desired to cleanse the hole by introducing an uninterrupted flow of pressure fluid, the supply of pressure fluid is temporarily cut off and the drill backed off from the work by the operator. The piston, then, by force of gravity and because of the leakage of air from the air cushion, moves forward beyond the normal forward limiting position to the stop, or rearward end, 82 of the tubular guide piece 70, as shown in Fig. 3. In consequence, the piston uncovers the port 80 to communicate the longitudinal bore 79 with the interior of the rearward end portion of the sleeve 12. It is to be noted that the distance between the stop 82 and the port 60 must be less than the distance between the pressure surface 78 and the rear end of the sliding-contact surface of the greater-diametered portion 17 of the piston 16, in order that the port 60 is covered by the piston when the piston is against the stop 82 to prevent admission of pressure fluid to the forward end of the sleeve 12 to prevent restarting of the piston.

When the supply of pressure fluid is re-opened by the operator, the pressure fluid flows through the bore 79 in the stem 50 and out of the port 80 into the rearward end of the sleeve 12. The pressure fluid then flows through the five secondary passages 61 into the central bore 62 of the piston 16. Then the pressure fluid flows through the central bore 64 to openings in the working implement from which it issues to cleanse the drill hole.

To re-start the reciprocation of the piston and resume normal drilling, the drill is lowered on the working implement, which moves rearwardly causing the piston to move rearwardly and cover the port 80 and uncover the port 60 to re-admit pressure fluid to operate on the pressure surface 78 of the piston 16 and to actuate the piston rearwardly.

I claim:

1. A pneumatic drill comprising a casing having a chamber therein, a hammer piston reciprocable in said chamber within normal limits in either direction when the drill is operating, said hammer piston having a longitudinal passage therethrough, said piston having a second passage communicating at its forward end with said first passage intermediate the ends thereof and terminating at its other end at the rearward end of said piston, a working implement having an end in said casing arranged to be struck by said piston and normally limiting the forward position of the piston when the drill is operating, a valve in said casing for valving compressed air to the opposite end portions of said chamber for actuating said piston, a stem longitudinally mounted against movement relative to the casing in said chamber and extending forwardly into said first passage of said piston with a slidable fit, said stem being of a length such that said stem extends beyond said forward end of said second passage when said piston is in its normal rearward limited position and lies rearwardly of said forward end of said second passage when said piston is in its normal forward limited position, said stem having a longitudinal bore communicating at the rearward end thereof with an air supply, a port formed in said stem and communicating with said longitudinal bore of said stem, said port being at a location such that said port is covered by said piston during the normal operation of the drill and uncovered when said piston is moved forwardly of its normal forward limited position by cutting off the air supply and moving the drill away from the work, a passage in said casing for conducting compressed air from said valve to the forward end portion of said chamber and including a port formed in said casing and communicating with the forward end portion of said chamber at a location such that said port is closed by said piston when said piston is moved forwardly of its normal forward limited position by cutting off the air supply and moving the drill away from the work, and means for exhausting such air from the forward end portion of said chamber.

2. A down-the-hole pneumatic drill comprising a casing having a chamber therein, a hammer piston reciprocable in said chamber within normal limits in either direction when the drill is operating, said hammer piston having a portion thereof slidably fitted in said chamber, said piston having a longitudinal passage therethrough, said piston having a second passage communicating at its forward end with said first passage intermediate the ends thereof and terminating at its other end at the rearward end of said piston, a working implement having an end in said casing arranged to be struck by said piston and normally limiting the forward position of the piston when the drill is operating, a stop mounted at the forward end of said chamber for limiting the forward motion of said piston, a valve in said casing for valving compressed air to the opposite end portions of said chamber for actuating said piston, a stem longitudinally mounted against movement relative to the casing in said chamber and extending forwardly into said first passage of said piston and having a slidable fit with at least portions thereof located on opposite sides of said forward end of said second passage, said stem being of a length such that said stem extends beyond said forward end of said second passage when said piston is in its normal rearward limited position to stop the flow of compressed air from said second passage into said first passage and lies rearwardly of said forward end of said second passage when said piston is in its normal forward limited position to permit the flow of compressed air from said second passage into said first passage, said stem having a longitudinal bore communicating at the rearward end thereof with an air supply, a port formed in said stem and communicating with said longitudinal bore of said stem, said port being at a location such that the distance of said port from the rearmost portion of said stop measured along the axis of the drill is greater than the distance from the portion of said piston that contacts said stop to the rearward end of the rearmost sliding contact portion of said first passage of said piston measured along the axis of said piston, a passage in said casing for conducting compressed air from said valve to the forward end portion of said chamber and including a port formed in said casing and communicating with the forward end portion of said chamber at a location such that said port is closed by said piston when said piston is in contact with said stop, and means for exhausting such air from the forward end portion of said chamber at the forward end of said casing.

3. A down-the-hole pneumatic drill comprising a casing having a chamber therein, a hammer piston reciprocable in said chamber within normal limits in either direction when the drill is operating, said hammer piston having a portion thereof slidably fitted in said chamber, said piston having a longitudinal passage therethrough, said piston having a plurality of secondary passages communicating at their forward ends with said first passage intermediate the ends thereof and terminating at their other ends at the rearward end of said piston, a working implement having an end in said casing arranged to be struck by said piston and normally limiting the forward position of the piston when the drill is operating, a stop mounted at the forward end of said chamber for limiting the forward motion of said piston, a valve in said casing for valving compressed air to the opposite end portions of said chamber for actuating said piston, a stem longitudinally mounted against movement relative to the casing in said chamber and extending forwardly into said first passage of said piston with a slidable fit, said stem being of a length such that said stem extends beyond said forward ends of said secondary passages when said piston is in its normal rearward limited position to stop the flow of compressed air from said secondary passages into said first passage and lies rearwardly of said forward ends of said secondary passages when said piston is in its normal forward limited position to permit the flow of compressed air from said secondary passages into said first passage, said stem having a longitudinal bore communicating at the rearward end thereof with an air supply, a port formed in said stem and communicating with said longitudinal bore of said stem, said port being at a location such that the distance of said port from the rearmost portion of said stop measured along the axis of the drill is greater than the distance from the portion of said piston that contacts said stop to the rearward end of the rearmost sliding contact portion of said first passage of said piston measured along the axis of said piston, a passage in said casing for conducting compressed air from said valve to the forward end portion of said chamber and including a port formed in said casing and communicating with the forward end portion of said chamber at a location such that said port is closed by said piston when said piston is in contact with said stop, and means for exhausting such air from the forward end portion of said chamber including a passage through said working implement.

References Cited in the file of this patent

UNITED STATES PATENTS

| | | |
|---|---|---|
| 816,090 | Hellman et al. | Mar. 27, 1906 |
| 909,259 | Taylor | Jan. 12, 1909 |
| 1,205,140 | App | Nov. 21, 1916 |
| 2,580,203 | Topanelian | Dec. 25, 1951 |